United States Patent
Grimsbo et al.

(10) Patent No.: US 9,840,905 B2
(45) Date of Patent: Dec. 12, 2017

(54) DETERMINING THE LOCATION OF A MATERIAL LOCATED BEHIND AN OBSTRUCTION

(75) Inventors: Gjermund Grimsbo, Trondheim (NO); Marcus Fathi, Trondheim (NO); Bjarne Bugten, Hundhamaren (NO)

(73) Assignee: STATOIL PETROLEUM AS, Stavanger (NO)

( * ) Notice: Subject to any disclaimer, the term of this patent is extended or adjusted under 35 U.S.C. 154(b) by 1045 days.

(21) Appl. No.: 14/123,044

(22) PCT Filed: Jun. 1, 2011

(86) PCT No.: PCT/EP2011/059059
§ 371 (c)(1),
(2), (4) Date: Dec. 31, 2013

(87) PCT Pub. No.: WO2012/163420
PCT Pub. Date: Dec. 6, 2012

(65) Prior Publication Data
US 2014/0121979 A1    May 1, 2014

(51) Int. Cl.
*G01H 1/00* (2006.01)
*E21B 47/09* (2012.01)
*G01H 1/06* (2006.01)
*E21B 47/00* (2012.01)

(52) U.S. Cl.
CPC ........ *E21B 47/091* (2013.01); *E21B 47/0005* (2013.01); *G01H 1/06* (2013.01)

(58) Field of Classification Search
CPC ................ E21B 47/091; G01H 1/06

USPC ....................... 73/579, 152; 702/11
See application file for complete search history.

(56) References Cited

U.S. PATENT DOCUMENTS

| | | | |
|---|---|---|---|
| 2006/0042869 A1* | 3/2006 | Ferren | G01F 17/00 181/139 |
| 2007/0251298 A1* | 11/2007 | Sivaraman | G01N 29/036 73/24.01 |
| 2008/0236814 A1 | 10/2008 | Roddy | |
| 2010/0051266 A1* | 3/2010 | Roddy | E21B 33/13 166/250.01 |
| 2011/0122727 A1* | 5/2011 | Gleitman | E21B 36/02 367/81 |

FOREIGN PATENT DOCUMENTS

AU    557344 B    12/1986
EP    1 795 919 A2    6/2007

* cited by examiner

*Primary Examiner* — Lisa Caputo
*Assistant Examiner* — Tarun Sinha
(74) *Attorney, Agent, or Firm* — Birch, Stewart, Kolasch & Birch, LLP (57) ABSTRACT

A method and apparatus for determining the location of a material located behind an obstruction. A plurality of acoustic resonators (6) having a known resonant frequency are dispersed in the material (3), the material to be located on a first side of the obstruction (2). An instrument (5) is provided at an opposite side of the obstruction to the material. The instrument emits an acoustic signal and measures a response. If the resonant frequency is detected, it is determined that the material is located substantially adjacent to the instrument. The apparatus may be used for determining the height of cement slurry located between a well casing wall and a borehole.

17 Claims, 5 Drawing Sheets

DETERMINING THE LOCATION OF A MATERIAL LOCATED BEHIND AN OBSTRUCTION

FIELD OF THE INVENTION

The present invention relates to the field of determining the location of a material located behind an obstruction. The present invention also relates to the field of determining the quality and condition of the material in addition to its location.

BACKGROUND TO THE INVENTION

Well, or borehole logging involves making an analysis of the conditions of a well and surrounding geological formations. It may be performed by lowering instruments into the well on a wireline that can take measurements at different points in the well.

Acoustic instruments are used for obtaining information using ultrasonic waves. They include a source of ultrasonic waves and a sensor to measure a response to the produced ultrasonic wave.

During completion of a well, the casing may be cemented. Cementing is used to seal and protect the well, and to create a well barrier to prevent fluid migration. Cementing involves deploying a cement slurry and allowing it to fill a space between a well casing and the wellbore. The required physical properties of the cement may differ depending on the nature of the well, and so the correct type of cement must be prepared. Additives include accelerators, which shorten the setting time required for the cement, as well as retarders, make the cement setting time longer. The density of the cement may be controlled using different additives, and additives may also be used to affect the compressive strength of the cement.

In many territories, it is a legal requirement to cement a casing up to a certain height. As the volume between the well casing and the borehole wall may not be precisely known, pumping a certain volume of cement into the annulus may not give cement up to the required height. There is a requirement for a technique that can accurately determine the height of the cement even when it is located behind the well casing.

Figure 1:
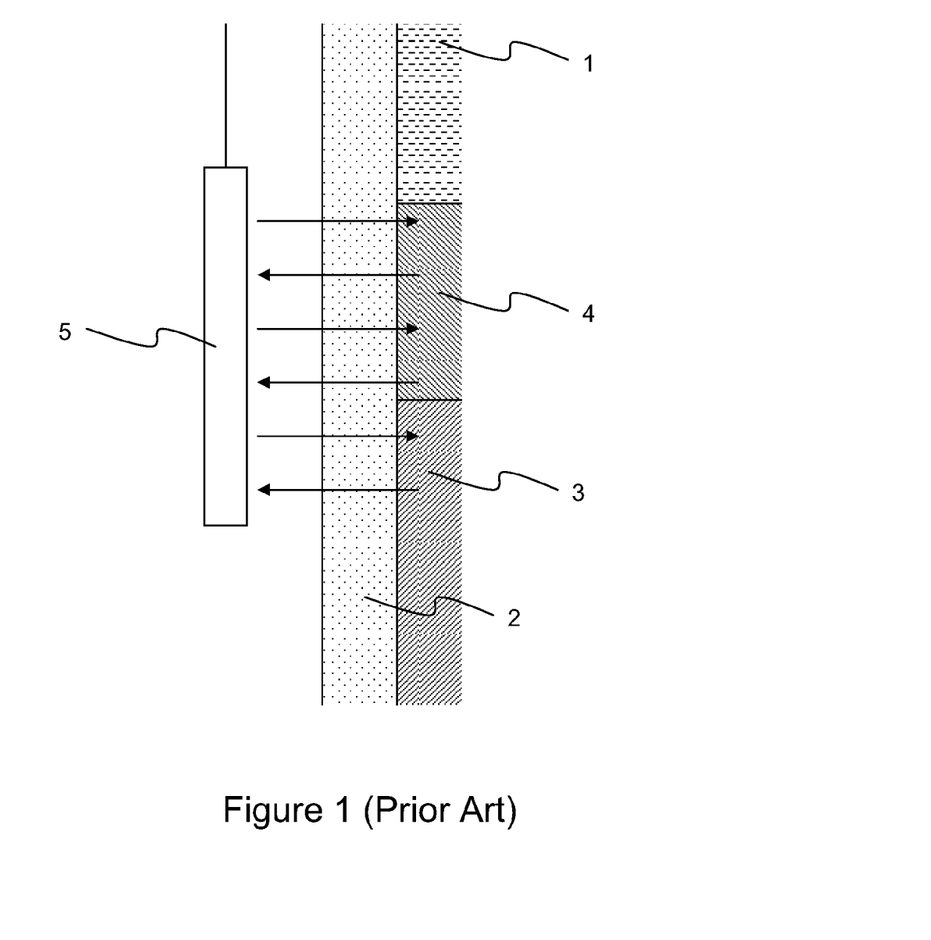
FIG. 1 illustrates schematically a cross section view of a borehole during a cementing operation.

A further issue with cementing is mixing of the cement with other fluids. Referring to FIG. 1, when the borehole has been drilled it is full of drilling fluid, termed mud 1. A casing 2 is introduced into the borehole which typically has a steel wall. Cement slurry 3 is introduced into the annulus from the bottom of the borehole between the casing 2 and the sides of the borehole. This displaces the mud 1. Spacer fluid 4 is disposed between the cement slurry 3 and the mud 1. Spacer fluid 4 is a viscous fluid used to aid in displacement of the mud 1 by the cement slurry 3 and to prevent mixing of the cement 3 and the mud 1. When the fluids exit the casing and enter the annulus of the well, there is no physical separation of the fluids, other than their rheological properties, and mixing of the fluids is possible.

It is necessary to ensure that no mixing has occurred between the mud 1, the spacer 4 and the cement slurry 3. Any mixing between the mud 1 and the cement slurry 3 in particular will be detrimental to the final properties of the cement.

There are several techniques for monitoring the properties of cement. For example, US 2008/0236814 describes using MEMs sensors which communicated with an interrogator tool to monitor various properties of the cement. However, this technique is expensive. A more common technique to monitor the properties of the cement 3 is to use an ultrasonic acoustic instrument 5, as shown in FIG. 1. By sending ultrasonic signals from the instrument 5 and interpreting responses, information about cement, such as the degree of mixing, the degree of hardening, casing dimensions and so on can be obtained. By monitoring responses, the instrument 5 can be used to determine the properties of a fluid, and in particular whether the fluid is a mixture of mud 1 and cement slurry 3.

Existing acoustic techniques are limited in their reliability, resolution and range. For example, acoustic logs are generally effective only through a single wall layer. Where a casing has more than one wall, the results of acoustic techniques may give no useful information about the nature of the fluid behind the casing wall 2. In order to log behind a second wall, the first wall needs to be removed as the acoustic waves would otherwise be reflected by the first wall. In many circumstances this is impossible, and even in situations where it can be done it is time consuming and expensive.

The operator therefore has limited knowledge about the height of the cement behind the casing wall, and whether or not any mixing has occurred between the cement slurry 3 and the mud 1, and so does not know whether or not the cementing operation has been successful.

SUMMARY OF THE INVENTION

It is an object of the invention to allow an operator to determine whether any mixing has occurred between fluids, for example mud and cement slurry.

According to a first aspect of the invention, there is provided a method of determining the location of a material located behind an obstruction. A plurality of acoustic resonators having a known resonant frequency are dispersed in the material. The material is located on a first side of the obstruction. An instrument is provided at an opposite side of the obstruction to the material, and used to emit an acoustic signal. If the instrument detects the resonant frequency, it is determined that the material is located substantially adjacent to the instrument. Detecting a resonant frequency allows an operator to accurately determine when the material is located substantially adjacent to the instrument on the other side of the obstruction.

In an optional embodiment, the obstruction comprises a well casing wall, and the material is disposed between the well casing and the borehole. In this case, the instrument may be introduced into the well casing on a wireline, or it may be already disposed at a fixed location within the well casing.

Optionally, the method comprises dispersing a second plurality of acoustic resonators having a known second resonant frequency in a second material also located behind the obstruction. In the event that the second resonant frequency is detected, it can be determined that the second material is located substantially adjacent to the instrument. This allows the detection of more than one material behind the obstruction. If the resonant frequency and the second resonant are detected when the instrument is at a given location, it can be determined that a mixture of the material and the second material is present substantially adjacent to the instrument at that location.

As an option, the material is a fluid. This may be a sealant such as a cement slurry, polymer or polymer gel. The second material may be a drilling fluid or a spacer fluid.

Any type of acoustic resonator may be used. Typically, each acoustic resonator comprises a solid body having a characteristic dimension that gives rise to the resonant frequency. For example, the plurality of acoustic resonators may comprise a plurality of solid spheres filled with a gas, or a plurality of rings. Similarly, the second plurality of acoustic resonators may also comprise a solid body having a characteristic dimension that gives rise to a different resonant frequency to that of the plurality of solid spheres.

According to a second aspect, there is provided a system for determining the location of a material located behind an obstruction. The system includes an instrument for locating at a side of the obstruction opposite to that of the material. The instrument comprises a source for emitting an acoustic signal, and sensors for detecting a response to the acoustic signal. A processor is provided for comparing the frequency of the detected responses with a resonant frequency of an acoustic resonator known to be dispersed in the material and, in the event that the frequency of the response corresponds with a resonant frequency of the acoustic resonator, a determination is made the material is located substantially adjacent to the instrument.

According to a third aspect, there is provided a computer device for determining the location of a material located behind an obstruction. The computer device is provided with a receiver for receiving, from an instrument located at a side of the obstruction opposite to that of the material, information relating to a location of the instrument, and response frequencies detected in response to emitting an acoustic signal. A processor is also provided for comparing the response frequency to a resonant frequency of an acoustic resonator known to be dispersed in the material and, in the event that the response frequency corresponds with the resonant frequency, determining that the instrument is located substantially adjacent to the material.

The processor is optionally further arranged to compare the response frequency with a second resonant frequency of a second acoustic resonator dispersed in a second material located at the same side of the obstruction as the material and, in the event that the response frequency corresponds with the second resonant frequency, determining that the instrument is located substantially adjacent to the second material.

As a further option, the processor is arranged to determine that a mixture of the first and second material is adjacent to the instrument in the event that response frequencies correspond with both the resonant frequency and the second resonant frequency.

The computer device optionally comprises a database, the database including information associating resonant frequencies of different acoustic resonators with materials to which the acoustic resonators are added.

According to a fourth aspect, there is provided a computer program, comprising computer readable code which, when run on a computer device, causes the computer device to behave as a computer device described above in the third aspect.

According to a fifth aspect, there is provided a computer program product comprising a computer readable medium and a computer program described above in the fourth aspect, wherein the computer program is stored on the computer readable medium.

According to a sixth aspect, there is provided an acoustic resonator, having a known resonant frequency, for dispersing in a material to be located behind a barrier.

As an option, the material is to be located between a well casing and a borehole, and the barrier comprises the well casing wall.

The acoustic resonator optionally comprises a solid body having a characteristic dimension that gives rise to the resonant frequency.

DETAILED DESCRIPTION OF CERTAIN EMBODIMENTS

Acoustic resonance occurs when an acoustic system has a natural frequency of vibration that corresponds to an acoustic frequency to which the system is subjected. At the resonant frequency, the acoustic system absorbs more energy and has a greater amplitude of vibration, meaning that reflections from the acoustic frequency are stronger than they would otherwise be.

By adding an acoustic resonator to the cement slurry 3, and using the instrument to generate an acoustic frequency that matches the acoustic resonator, a much stronger signal can be detected.

Figure 2:
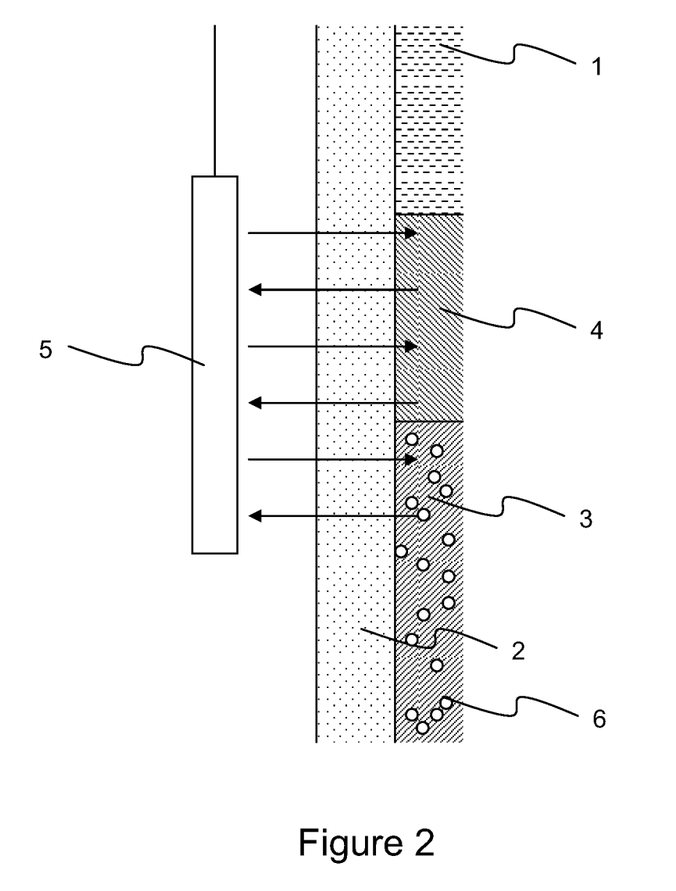
FIG. 2 illustrates schematically a cross section view of a borehole during a cementing operation according to an embodiment of the invention.

Referring to FIG. 2 herein, there is shown substantially the same system as illustrated in FIG. 1, but with acoustic resonators 6 added to the cement slurry 3. When the instrument sends an acoustic wave at substantially the same wavelength as the resonant frequency of the acoustic resonators 6, the response from the acoustic resonator will be very large compared to other responses. As the instrument is lowered down the well, it transmits acoustic waves. As the acoustic responses from the acoustic resonators are much stronger than those of other acoustic reflections detected by the instrument 5, and at known resonant frequencies, it is very clear when the instrument is adjacent to cement slurry 3.

By recording the location of the instrument 5 in the well when response is detected from the acoustic resonators 6, the location of the cement slurry 3 can be accurately determined. This allows the user to determine the height of the cement slurry behind a casing wall.

As the acoustic resonance of the acoustic resonators 6 gives such strong signals, the location of the cement slurry 3 can be determined even when the cement slurry 3 is separated from the instrument 5 by more than one casing wall.

Furthermore, the acoustic resonators exhibit "decay"; when they are stimulated by an acoustic wave at their resonant frequency they vibrate at their resonant frequency, and when the stimulating acoustic wave is removed the acoustic resonators continue to vibrate for a certain time. Determining that decay at the resonant frequency is present confirms that the acoustic resonators are present behind the casing wall.

Any suitable acoustic resonator 6 may be used. Typically, they comprise a solid body having a characteristic dimension that gives rise to a characteristic resonant frequency. For example, hollow glass spheres may be used that contain air or another gas. The advantage of using glass is that it will not react with the cement slurry 3, and is sufficiently durable and stable under the conditions to which it will be subjected. The resonant frequency of the glass spheres is related to the size of the sphere. Glass rings have also been found to work effectively. The solid material of the acoustic resonators should be sufficiently rigid to provide strong vibrations at the resonant frequency. Other shapes that may be used include cubes, cylinders, pyramids and so on.

Figure 3:
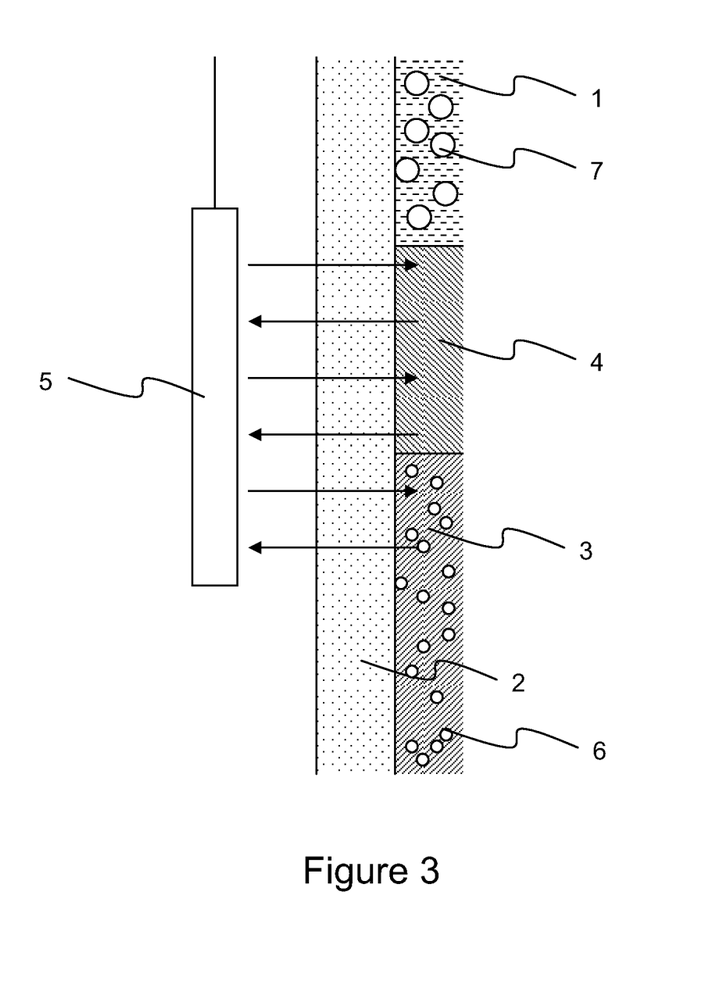
FIG. 3 illustrates schematically a cross section view of a borehole during a cementing operation according to a further embodiment of the invention.

As the resonant frequency of the acoustic resonator is related to the characteristic dimension, a second set of acoustic resonators having a different characteristic dimension to those added to the cement slurry 3 may be added to the mud 1. This is illustrated in FIG. 3.

As the instrument 5 is lowered down the well, it will detect the second set of acoustic resonators 7 that have been added to the mud, as they will resonate at their known resonant frequency in response to the acoustic waves sent by the instrument. The instrument can therefore accurately determine the location of the mud. As the instrument is lowered further, and moves to a location adjacent to the cement slurry 3, it will detect the resonant frequency of acoustic resonators 6 added to the cement slurry 3, and can therefore accurately determine the location of the cement slurry 3.

Figure 4:
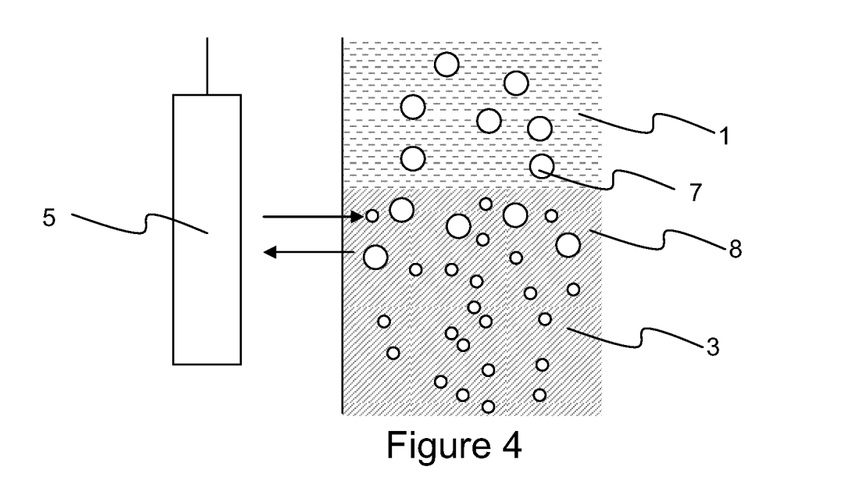
FIG. 4 illustrates schematically a cross section view of a borehole during a cementing operation where mixing has occurred between cement slurry and mud according to an embodiment of the invention.

The instrument can also be used to detect whether any mixing of fluids has occurred. Referring to FIG. 4, a scenario is illustrated in which the mud 1 and the cement slurry 3 have mixed at their interface. In this case, when the instrument 5 moves past the area 8 that contains a mixture of mud 1 and cement slurry 3, it will detect the resonant frequencies of both the acoustic resonators 6 that have been added to the cement slurry 3 and the acoustic resonators 7 that have been added to the mud 1, as both sets of acoustic resonators 6, 7 are present in the area 8 that contains a mixture of mud 1 and cement slurry 3.

Note that in addition to determining the height of the cement slurry 3 and the degree of mixing between the cement slurry 3 and the mud 1, the information obtained from the instrument can be analysed to determine other properties such as temperature, pressure, condition of the well casing, volume in the space between the well casing and the borehole wall and so on. Other parameters that can be used in addition to detecting the presence of a response at the characteristic resonant frequency include decay and amplitude of response.

It will be appreciated that a third set of acoustic resonators may be added to the spacer fluid 4 in order to allow the instrument to determine the location of the spacer fluid 4 behind the casing wall 2. In fact, acoustic resonators may be added to any fluid between the casing and the wall of the wellbore in order to ascertain its location and height.

Note that the above description assumes that the instrument is introduced into the well. It will be appreciated that the instrument could be disposed in the well at a fixed location. For example, if it is required to cement up to a height of 200 meters, then an instrument can be located in the well at the required height. When the cement pumping operation begins, the instrument can send acoustic signals. Once a resonant response from the acoustic resonators has been detected, the operator knows that the cement slurry 3 has reached the same height as the instrument.

Figure 5:
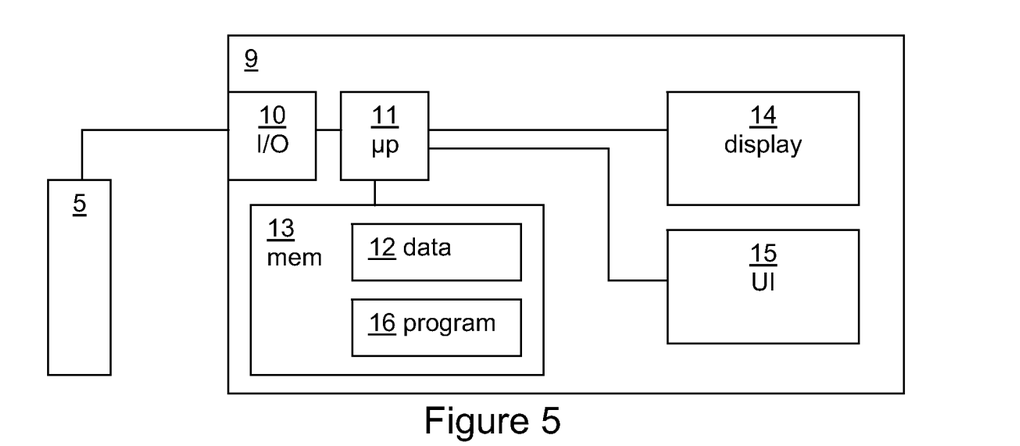
FIG. 5 illustrates schematically in a block diagram a computer device according to an embodiment of the invention.

FIG. 5 shows a computer device 9 for manipulating the data obtained by the instrument 5. The computer device is provided with an In/Out device that includes receiver 10 for receiving from the instrument information about the location of the instrument 5 and responses (including the frequency and in some cases the amplitude of the responses) to acoustic signals emitted by the instrument 5. The In/Out device 10 may also be used to send control signals from the computer device 9 to the instrument 5.

A processor 11 is used to analyse the received information. Response frequencies are compared with resonant frequencies of known acoustic resonators dispersed in one or more fluids known to be located between the well casing 2 and the borehole. The resonant frequencies are typically stored in a database 12. The database 12 is stored on a computer readable medium in the form of a memory 13.

If resonant frequencies are detected that correspond to any response frequencies, then the processor maps the location of the instrument 5 with the material associated with the resonant frequency in order to build up a 'picture' of the locations of materials such as cement slurry 3 and mud 1 between the well casing 2 and the borehole.

If more than one resonant frequency is detected corresponding to two ore more different types of acoustic resonator, the processor 11 determines that some mixing of the materials has occurred at that location.

The computer device may also be provided with a visual display 14 for displaying information to a user, and a user interface 15 for allowing a user to enter information that may be used to control the instrument 5, for example by determining the frequency of the emitted acoustic signals.

Information may be typically displayed to a user in a graphical or text format. By way of example, a graphical format may include a schematic of the well showing the locations at which acoustic resonators have been detected. The display may present the information about acoustic resonators in such a way that the user can analyse and interpret the information.

A computer program 16 may also be stored at the memory 13. When the program 16 is executed by the processor 11, it causes the computer device 9 to behave as described above.

Figure 6:
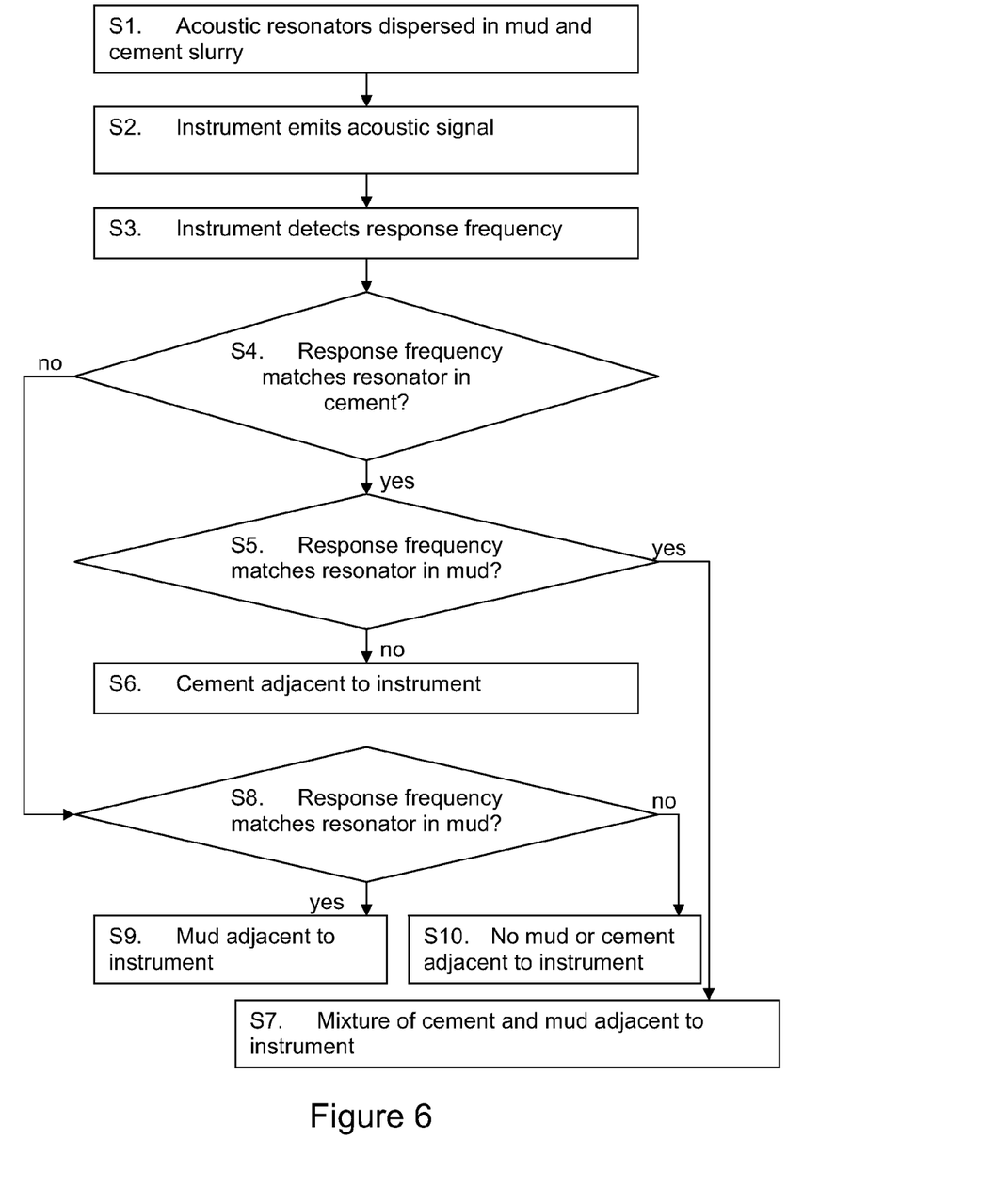
FIG. 6 is a flow diagram illustrating the steps of an embodiment of the invention.

FIG. 6 is a flow diagram illustrating the steps of the invention. This example assumes that acoustic resonators 6 have been dispersed in the cement slurry 3, and acoustic resonators 7 have been dispersed in the mud 1. The following numbering corresponds to the numbering of FIG. 6:

S1. Acoustic resonators 6, 7 with different resonant frequencies are dispersed in the cement slurry 3 and mud 1 respectively. The cement slurry is then pumped into the gap between the casing wall 2 and the borehole, displacing the mud 1.

S2. The instrument 5 is lowered into the casing and emits an acoustic signal.

S3. Any acoustic resonators located in the mud 1 or cement slurry 3 located behind the casing wall 2 will resonate at their resonant frequency, and this resonant frequency response is detected by the instrument 5.

S4. A check is made to determine whether the measured response frequency corresponds to the resonant frequency of the acoustic resonators 6 dispersed in the cement slurry 3. If it does, it can be determined that cement is located behind the casing wall 2 and adjacent to the instrument 5. If it doesn't, then the method continues at step S8.

S5. A further check is made to determine whether a measured frequency response corresponds to the acoustic resonators 7 dispersed in the mud. If not then the method proceeds at step S6, if so then the method proceeds at step S7.

S6. As only the resonant frequency of the acoustic resonator 6 dispersed in the cement slurry 3 has been detected, then it is known that only cement is located behind the casing wall 2 adjacent to the instrument 5.

S7. As the resonant frequency of the acoustic resonator 6 dispersed in the cement slurry 3 and the resonant frequency of the acoustic resonator 7 dispersed in mud 1 have been detected, then it is known that a mixture of cement slurry 3 and mud 1 is located behind the casing wall 2 adjacent to the instrument 5. In this case, corrective action may need to be taken to reduce the mixing or ameliorate the effects of the mixing.

S8. As the resonant frequency of the acoustic resonator 6 dispersed in the cement slurry 3 has been detected, a further check is made to detect whether or not the resonant frequency of the acoustic resonator 7 dispersed in the mud 1 has been detected. If it has been detected, then the method proceeds at step S9, otherwise the method proceeds at step S10.

S9. As only the resonant frequency of the acoustic resonator dispersed in the mud 1 has been detected, then it is determined that only mud 1 is located behind the casing wall 2 adjacent to the instrument 5.

S10. As neither the resonant frequency of the acoustic resonator 6 dispersed in the cement slurry 3 nor the resonant frequency of the acoustic resonator 7 dispersed in mud 1 have been detected, then it is known neither cement slurry 3 or mud 1 are located behind the casing wall 2 adjacent to the instrument 5. This may be, for example, because spacing fluid may be located behind the casing wall. Note that the spacing fluid may also contain dispersed acoustic resonators having a resonant frequency different to that of the acoustic resonators 7 dispersed in the mud 1 and the acoustic resonators dispersed in the cement slurry 3. If so, then more detail can be obtained about the fluids located behind the casing wall 2, and evidence of any mixing between the spacer fluid 4 and either of the mud 1 or the cement slurry 3 can be obtained.

The invention provides improved data that can be used to determine the effectiveness of a cementing operation. By logging the location of cement slurry (and, if necessary, mud and spacer fluid), an accurate determination can be made of the location of cement slurry located behind a casing wall, even in circumstances where the cement is located behind two or more walls, whereas other acoustic techniques are limited to a single wall. This allows an operator to determine whether or not the cement slurry has reached a required height.

Furthermore, the invention provides accurate information about the mixing of fluids behind the casing wall 2 which would otherwise inaccurate or unavailable in circumstances where a double wall is provided.

It will be appreciated by the person of skill in the art that various modifications may be made to the above described embodiments without departing from the scope of the present invention as defined in the appended claims. For example, it will be appreciated that the invention may be used to determine the location of a material behind any type of obstruction, and need not only apply to cementing operations between a well casing wall and borehole. Furthermore, the above description refers to cementing operations, but it will be appreciated that materials other than cement may be used to seal a well, such as various polymer and polymer gel formulations.

Embodiments described above may be used to determine the location and condition of any sealants that are used to seal a well.

The invention claimed is:

1. A method of determining the location of a material located behind an obstruction, the method comprising:
   dispersing a plurality of acoustic resonators having a known resonant frequency in the material, the material to be located on a first side of the obstruction;
   providing an instrument at an opposite side of the obstruction to the material;
   from the instrument, emitting an acoustic signal;
   in the event that the resonant frequency is detected, determining that the material is located substantially adjacent to the instrument;
   dispersing a second plurality of acoustic resonators having a known second resonant frequency in a second material also located behind the obstruction; and
   in the event that the second resonant frequency is detected, determining that the second material is located substantially adjacent to the instrument.

2. The method according to claim 1, wherein the obstruction comprises a well casing wall, and the material is disposed between the well casing and the borehole.

3. The method according to claim 1, wherein the obstruction comprises a well casing wall, and the material is disposed between the well casing and the borehole, wherein the method comprises one of introducing the instrument into the well casing on a wireline, and disposing the instrument at a fixed location within the well casing.

4. The method according to claim 1, further comprising:
   in the event that both the resonant frequency and the second resonant are detected when the instrument is at a given location, determining that a mixture of the material and the second material is present substantially adjacent to the instrument at that location.

5. The method according to claim 1, wherein the material is a fluid.

6. The method according to claim 1, wherein the material is a sealant.

7. The method according to claim 1, wherein the material is a sealant is selected from any of cement slurry, polymer and polymer gel.

8. The method according to claim 1, wherein the second material is selected from any of a drilling fluid and a spacer fluid.

9. The method according to claim 1, wherein each acoustic resonator comprises a solid body having a characteristic dimension that gives rise to the resonant frequency.

10. The method according to claim 1, wherein the plurality of acoustic resonators comprise any of a plurality of solid spheres filled with a gas, and a plurality of rings.

11. The method according to claim 1, wherein the second plurality of acoustic resonators comprise a solid body having a characteristic dimension that gives rise to a different resonant frequency to that of the plurality of solid spheres.

12. A system for determining the location of a material located behind an obstruction, the system comprising:
    an instrument for locating at a side of the obstruction opposite to that of the material, the instrument comprising a source for emitting an acoustic signal and sensors for detecting a response to the acoustic signal;

a processor for comparing the frequency of the response with a resonant frequency of an acoustic resonator dispersed in the material, and in the event that the frequency of the response corresponds with the resonant frequency of the acoustic resonator, determining that the material is located substantially adjacent to the instrument, wherein the processor is further arranged to compare the response frequency with a second resonant frequency of a second acoustic resonator dispersed in a second material located at the same side of the obstruction as the material and, in the event that the response frequency corresponds with the second resonant frequency, determining that the instrument is located substantially adjacent to the second material.

13. A computer device for determining the location of a material located behind an obstruction, the computer device comprising:

a receiver for receiving, from an instrument located at a side of the obstruction opposite to that of the material, information relating to a location of the instrument, and response frequencies detected in response to emitting an acoustic signal; and a processor for comparing the response frequency to a resonant frequency of an acoustic resonator dispersed in the material, and in the event that the response frequency corresponds with the resonant frequency, determining that the instrument is located substantially adjacent to the material, wherein the processor is further arranged to compare the response frequency with a second resonant frequency of a second acoustic resonator dispersed in a second material located at the same side of the obstruction as the material and, in the event that the response frequency corresponds with the second resonant frequency, determining that the instrument is located substantially adjacent to the second material.

14. The computer device according to claim 13, wherein the processor is arranged to determine that a mixture of the first and second material is adjacent to the instrument in the event that response frequencies correspond with both the resonant frequency and the second resonant frequency.

15. The computer device according to claim 13, further comprising a database, the database including information associating resonant frequencies of different acoustic resonators with materials to which the acoustic resonators are added.

16. A computer program stored on a non-transitory computer-readable medium, comprising computer readable code which, when run on a computer device, causes the computer device to perform the steps of:

receiving, from an instrument located at a side of an obstruction opposite to that of a material located behind the obstruction, information relating to a location of the instrument, and response frequencies detected in response to emitting an acoustic signal;

comparing the response frequency to a resonant frequency of an acoustic resonator dispersed in the material, and in the event that the response frequency corresponds with the resonant frequency, determining that the instrument is located substantially adjacent to the material; and comparing the response frequency with a second resonant frequency of a second acoustic resonator dispersed in a second material located at the same side of the obstruction as the material and, in the event that the response frequency corresponds with the second resonant frequency, determining that the instrument is located substantially adjacent to the second material.

17. A computer program product comprising a computer readable medium and a computer program according to claim 16, wherein the computer program is stored on the computer readable medium.

\* \* \* \* \*